W. G. STEVENSON.
Rice-Hulling Machine.
No. 207,080. Patented Aug. 13, 1878.
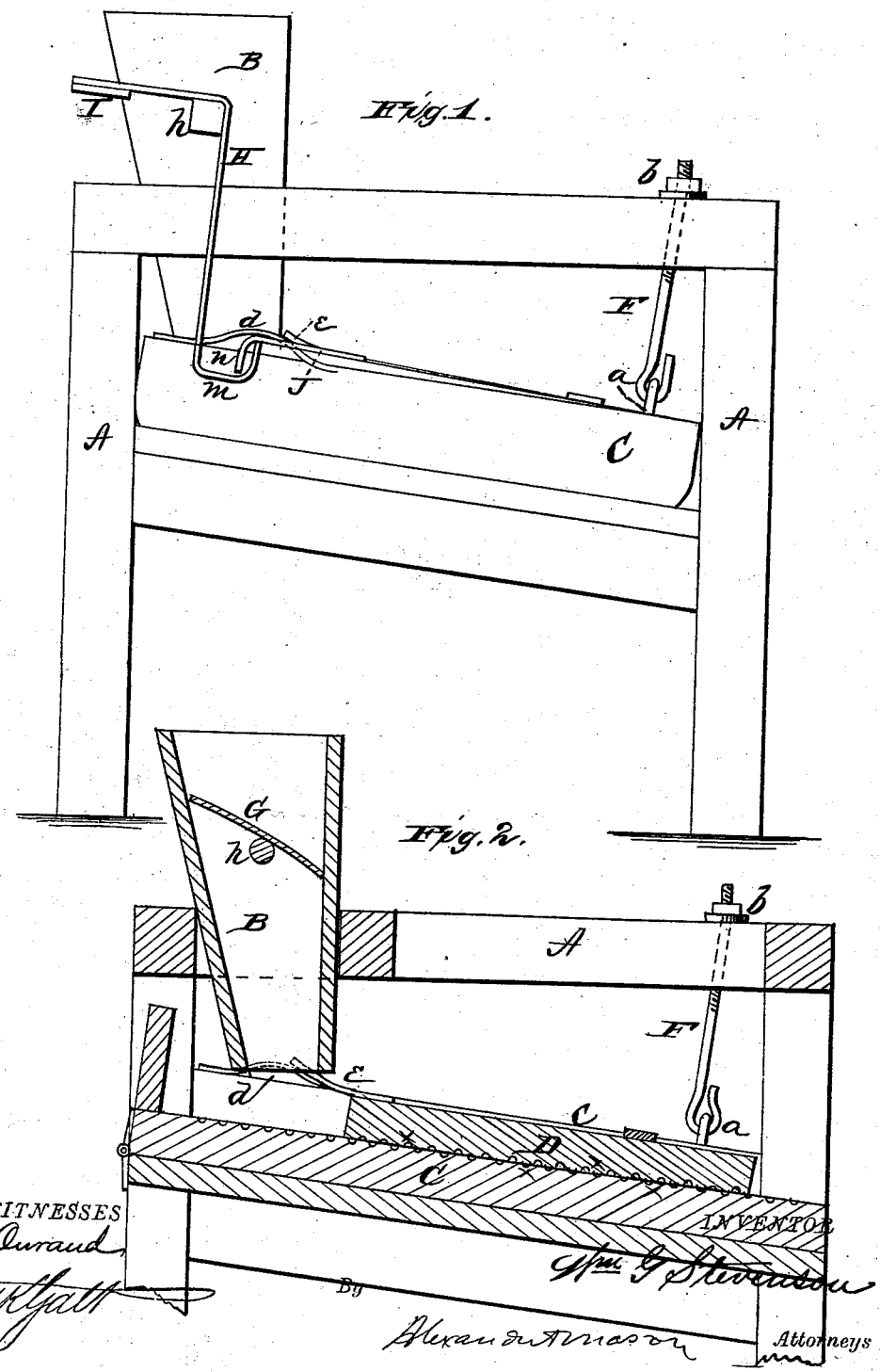

UNITED STATES PATENT OFFICE.

WILLIAM G. STEVENSON, OF MERIDIAN, MISSISSIPPI.

IMPROVEMENT IN RICE-HULLING MACHINES.

Specification forming part of Letters Patent No. 207,080, dated August 13, 1878; application filed June 26, 1878.

*To all whom it may concern:*

Be it known that I, WILLIAM G. STEVENSON, of Meridian, in the county of Lauderdale, and in the State of Mississippi, have invented certain new and useful Improvements in Rice-Hullers; and do hereby declare that the following is a full, clear, and exact description thereof, reference being had to the accompanying drawings, and to the letters of reference marked thereon, making a part of this specification.

The nature of my invention consists in the construction and arrangement of a machine for hulling rice, as will be hereinafter more fully set forth.

In order to enable others skilled in the art to which my invention appertains to make and use the same, I will now proceed to describe its construction and operation, referring to the annexed drawing, in which—

Figure 1 is a side elevation of my improved rice-huller; and Fig. 2 is a longitudinal vertical section of the same.

A represents the frame-work of the machine, provided at one end with a hopper, B, through which the rice is fed to the operating parts. The rice is hulled between a stationary inclined bed, C, and a reciprocating rubber, D. The inclined bed C is hinged at its upper end, and the lower end suspended by means of rods F F, which are hooked into eyes $a$ on the bed and pass upward through top side bars of the frame. Nuts $b$ $b$ are screwed on the upper ends of the rods, so that the inclination of the bed C can be easily adjusted as required.

The rubber D may be operated by a crank, gearing, or any other suitable or convenient means, so as to have a reciprocating motion. Both the incline C and rubber D are made of wood, placed endwise, and inclosed within suitable frames, as shown, and their adjacent surfaces corrugated, as shown at $x$ $x$.

On each side of the bed-frame, near the upper end, is an incline or riser, $d$, and the rubber D has on each side, at the upper end, a curved arm, $e$, which rides upon the riser $d$, and raises or lifts that end of the rubber at each upward stroke to admit the rough rice in between the bed and the rubber.

In the hopper B is a valve, G, attached to a shaft, $h$, which has its bearings in the ends of the hopper. One end of the shaft $h$, beyond the hopper, is made square, and to it is attached an angular or L-shaped lever, H, one arm of which is weighted, as shown at I, to hold the valve closed. The other arm of the lever H forms a hook, $m$, to be actuated by a hook, $n$, formed on an arm, J, attached to the rubber D. As the rubber moves downward, if the weight I should fail to close the valve, the hooks $n$ $m$ will do so; and as the rubber moves upward the arm J, striking the end of the lever L, will open the valve at the same time as the rubber is lifted by the risers $d$, and allow a certain quantity of rice to pass down and in between the bed and rubber.

Having thus fully described my invention, what I claim as new, and desire to secure by Letters Patent, is—

1. The valve G arranged in the hopper and operated by means of the weighted lever H, and the arm J on the rubber D, substantially as and for the purposes herein set forth.

2. The risers $d$ $d$ on the bed C, in combination with the rubber D, for the purposes set forth.

In testimony that I claim the foregoing I have hereunto set my hand this 21st day of May, 1878.

WILLIAM G. STEVENSON.

Witnesses:
HENRY MCKINZIE,
R. J. TRAVERS.